United States Patent
Miller

(10) Patent No.: US 8,022,014 B2
(45) Date of Patent: Sep. 20, 2011

(54) DEEP EUTECTIC SOLVENTS AND APPLICATIONS

(75) Inventor: Richard F. Miller, Humble, TX (US)

(73) Assignee: Shrieve Chemical Products, Inc.

( * ) Notice: Subject to any disclaimer, the term of this patent is extended or adjusted under 35 U.S.C. 154(b) by 168 days.

(21) Appl. No.: 12/410,662

(22) Filed: Mar. 25, 2009

(65) Prior Publication Data

US 2009/0247432 A1    Oct. 1, 2009

Related U.S. Application Data

(60) Provisional application No. 61/039,669, filed on Mar. 26, 2008.

(51) Int. Cl.
  *C09K 8/68*   (2006.01)
  *C09K 8/14*   (2006.01)
  *C09K 8/60*   (2006.01)
  *E21B 43/267* (2006.01)
  *E21B 43/16*  (2006.01)
  *E21B 43/26*  (2006.01)
  *E21B 37/00*  (2006.01)

(52) U.S. Cl. ..... 507/203; 507/100; 507/240; 166/280.1; 166/305.1; 166/308.1; 166/311

(58) Field of Classification Search ........... 507/100, 507/200, 203, 240; 166/280.1, 305.1, 308.1, 166/311
See application file for complete search history.

(56) References Cited

U.S. PATENT DOCUMENTS

| | | | |
|---|---|---|---|
| 4,302,252 A | | 11/1981 | Turbak et al. |
| 5,960,880 A | * | 10/1999 | Nguyen et al. ............. 166/280.1 |
| 2002/0019317 A1 | * | 2/2002 | Palmer et al. ................ 507/100 |
| 2002/0055439 A1 | * | 5/2002 | Palmer et al. ................ 507/200 |
| 2004/0097755 A1 | | 5/2004 | Abbott et al. |
| 2006/0166839 A1 | | 7/2006 | Miller |

OTHER PUBLICATIONS

CRC Handbook of Physics and Chemistry, p. 4-45, 4-61 and p. 6-154, 91st edition, 2010-2011.*
International Preliminary Report on Patentability and Written Opinion dated Sep. 28, 2010 issued in PCT/US09/38359, 5 pages.
International Search Report dated Nov. 3, 2009 issued in corresponding Application No. PCT/US09/38359, 3 pages.

* cited by examiner

*Primary Examiner* — Timothy J. Kugel
*Assistant Examiner* — Aiqun Li
(74) *Attorney, Agent, or Firm* — Porter Hedges LLP; Timothy S. Westby

(57) ABSTRACT

A method of solubilizing/removing cellulose or chemically-modified cellulosic polymers utilized in subterranean drilling operations such as fracturing. The method involves introducing a deep eutectic solvent (DES) into a subterranean region. Deep eutectic solvents useful as cellulose solvents include quaternary ammonium compounds, including choline chloride and chlorcholine chloride, reacted with a compound selected from amides, amines, carboxylic acids alcohols, and metal halides. The DES material can be pumped downhole after fracturing operations to remove cellulosic material used, for example, to thicken fracturing fluid which is left behind in the created fractures, on the face of the formation, along the wellbore, or elsewhere within the subterranean region. The DES can be used alone or in a sequential treatment protocol, whereby the DES is introduced into the subterranean region, followed by post-treatment introduction of water, caustic, acid or anhydride into the subterranean as a flush.

15 Claims, 1 Drawing Sheet

DEEP EUTECTIC SOLVENTS AND APPLICATIONS

CROSS-REFERENCE TO RELATED APPLICATIONS

This application claims the benefit under 35 U.S.C. §119(e) of U.S. Provisional Patent Application No. 61/039,669 entitled "Deep Eutectic Solvents and Applications," filed Mar. 26, 2008, the disclosure of which is hereby incorporated herein by reference.

STATEMENT REGARDING FEDERALLY SPONSORED RESEARCH OR DEVELOPMENT

Not applicable.

BACKGROUND

1. Field of the Invention

This invention relates generally to the field of subterranean drilling and material recovery. More specifically, this invention relates to the use of deep eutectic solvents and/or solutions to solubilize cellulose or modified cellulosic polymers used in subterranean drilling and fracturing operations.

2. Background of the Invention

Cellulose is one of the most abundant bio-renewable materials with a long and well-established technological base. Cellulose consists of poly-disperse linear glucose polymer chains which form extremely strong hydrogen-bonded supra-molecular structures making cellulose insoluble in water and most common organic liquids. Chemically-modified cellulose is significantly more soluble in water and imparts viscous properties to solutions making it useful as an ingredient in drilling and/or fracturing fluid useful in subterranean drilling operations. In the particular case of fracturing a formation, causing cracks to form in the subterranean strata, to allow for the production of hydrocarbon components with substantially greater ease, it is often necessary to clean the well bore and resulting fractures to remove cellulosic material that may have become deposited during the aforementioned operations and which will impede flow of hydrocarbons through the fractures and/or production.

As previously mentioned, cellulose is insoluble in water and most common organic solvents. Where chemically-modified cellulose is employed, it is not atypical for all or part of the material to be hydrolyzed under use conditions reforming the parent compound, cellulose, which will again become insoluble. Thus, given the frequency with which cellulosic material is employed in drilling and fracturing subterranean wells, the development of an additive and/or solvent for solubilizing cellulose and/or chemically-modified cellulosic material remains a continuing challenge in the oil and gas exploration industry.

In the prior art, room temperature ionic liquids (RTIL) can solubilize up to 15 wt % cellulose with heating to 150° F. employing preferably microwave heating. According to Swatlowski, et al. (U.S. Pat. No. 6,824,599), a solution of cellulose in an ionic liquid can contain cellulose in an amount of about 5 to about 35 weight percent; more preferably, the cellulose is present at about 5 to 25 weight percent, still more preferably from about 10 to about 25 weight percent. According to Swatlowski, this solubility of cellulose in (RTIL), such as [C4mim]Cl, is significantly higher than can be obtained using other solvents.

Consequently, there is a need for a method of removing cellulose and/or cellulosic compounds from a subterranean region. The method may prevent/minimize the deposition of cellulose and/or cellulosic compounds on or in the subterranean region or may solubilize deposited cellulose/cellulosic compounds deposited in a subterranean region, allowing removal thereof. Desirably, the method will allow better cost performance and/or improved toxicological and/or handling properties relative to RTILs, many of which react adversely with water.

SUMMARY

A method of treating a subterranean region, the method comprising: providing a eutectic solvent; and introducing the eutectic solvent into the subterranean region. In embodiments, providing a eutectic solvent further comprises reacting an ammonium compound with a second compound selected from the group consisting of amines, amides, carboxylic acids, alcohols, metal halides, and combinations thereof. In embodiments, the ammonium compound is a quaternary ammonium compound. The quaternary ammonium compound can be selected from quaternary ammonium halides. The quaternary ammonium compound can be selected from quaternary ammonium chlorides.

In embodiments, the ammonium compound is selected from the group consisting of compounds having the structures: $R_1R_2R_3—NR_4Cl$ and $ClR_1R_2R_3—NR_4Cl$, wherein $R_1$, $R_2$, and $R_3$ are selected from the group consisting of hydrogen and linear or branched alkyl, aryl, or alkylaryl groups $C_xH_y$, where $1 \leq x \leq 18$ and $3 \leq y \leq 37$, and $R_4$ is selected from the group consisting of hydrogen and groups having the structure $C_xH_y$ or $C_xH_yOH$, where $1 \leq x \leq 18$ and $3 \leq y \leq 37$. In embodiments, $R_1$, $R_2$, $R_3$, and $R_4$ are each selected from the group consisting of hydrogen, methyl-, ethyl-, octadecyl-, phenyl, benzyl- methoxy-, and ethoxy-groups. In embodiments, the ammonium compound is ammonium chloride. In embodiments, the ammonium compound is a quaternary ammonium chloride, wherein none of $R_1$, $R_2$, $R_3$, and $R_4$ is hydrogen. In embodiments, the ammonium compound is selected from the group consisting of chlorcholine chloride and choline chloride.

The second compound may have a chain length ($C_{length}$) of $1 \leq C_{length} \leq 18$. In embodiments, the second compound is urea, $H_2N—CO—NH_2$. In embodiments, the second compound is a di-functional amine selected from the group consisting of compounds with the structure: $R_1—(CH_2)_x—R_2$, wherein $2 \leq x \leq 6$, and $R_1$ and $R_2$ are selected from the group consisting of $—NH_2$, $—NHR_3$, and $—NR_3R_4$, where $R_3$ and $R_4$ are selected from alkyl, aryl, and alkylaryl groups. In embodiments, the di-functional amine is ethylene diamine, $H_2N—(CH_2)_2—NH_2$.

Also disclosed is a method of treating a subterranean region, the method comprising: providing an ammonium halide; reacting the ammonium halide with a hydrogen bond donor to provide a deep eutectic solvent; and introducing the deep eutectic solvent into a subterranean region. In embodiments, the subterranean region was previously treated with a drilling fluid or a fracturing fluid comprising cellulosic material. In embodiments, the deep eutectic solvent is capable of solubilizing up to 30 wt % cellulosic material. In embodiments, the deep eutectic solvent is introduced into the subterranean region as an additive in a fracturing or other drilling fluid.

In embodiments, the ammonium halide is selected from the group consisting of quaternary ammonium chlorides. The ammonium halide may be selected from the group consisting of chlorcholine chloride, choline chloride, ammonium chloride, and combinations thereof. In embodiments, the hydrogen bond donor is selected from amides, carboxylic acids, alcohols and metal halides. In embodiments, the hydrogen bond donor is selected from amides. The hydrogen bond donor may be selected from the group consisting of urea, 1-methyl urea, dimethyl urea, thiourea, acetamide, and combinations thereof. In embodiments, the hydrogen bond donor is urea.

In embodiments, the method further comprises introducing one or more wash solution into the subterranean following introducing the deep eutectic solvent into a subterranean region. The one or more wash solution can be selected from the group consisting of caustic solutions, acid solutions, anhydride solutions, water, and combinations thereof. In embodiments, more than one wash solution is introduced into the subterranean region in series.

Also disclosed is a method of treating a subterranean region for removal of cellulosic material therein or minimization/prevention of deposition of cellulosic material therein, the method comprising: reacting a quaternary ammonium chloride selected from the group consisting of chlorcholine chloride and choline chloride with a hydrogen bond donor selected from the group consisting of amides, carboxylic acids, alcohols and metal halides to produce a deep eutectic solvent; and introducing the deep eutectic solvent into the subterranean region, whereby cellulosic material is solubilized in the deep eutectic solvent. In embodiments, the deep eutectic solvent is introduced into the subterranean region as an additive to a fracturing fluid comprising cellulosic material. In embodiments, the subterranean region was treated with a fracturing fluid or drilling fluid comprising cellulosic material prior to introducing the deep eutectic solvent therein. In embodiments, the quaternary ammonium chloride is chlorcholine chloride and the hydrogen bond donor is urea. In embodiments, the quaternary ammonium chloride is choline chloride and the hydrogen bond donor is urea. Reacting may comprise combining the quaternary ammonium chloride and the hydrogen bond donor to form a mixture, and heating the mixture to a temperature of greater than 70° C.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWING

For a more detailed description of the preferred embodiment of the present invention, reference will now be made to the accompanying drawing, wherein.

NOTATION AND NOMENCLATURE

Figure 1:
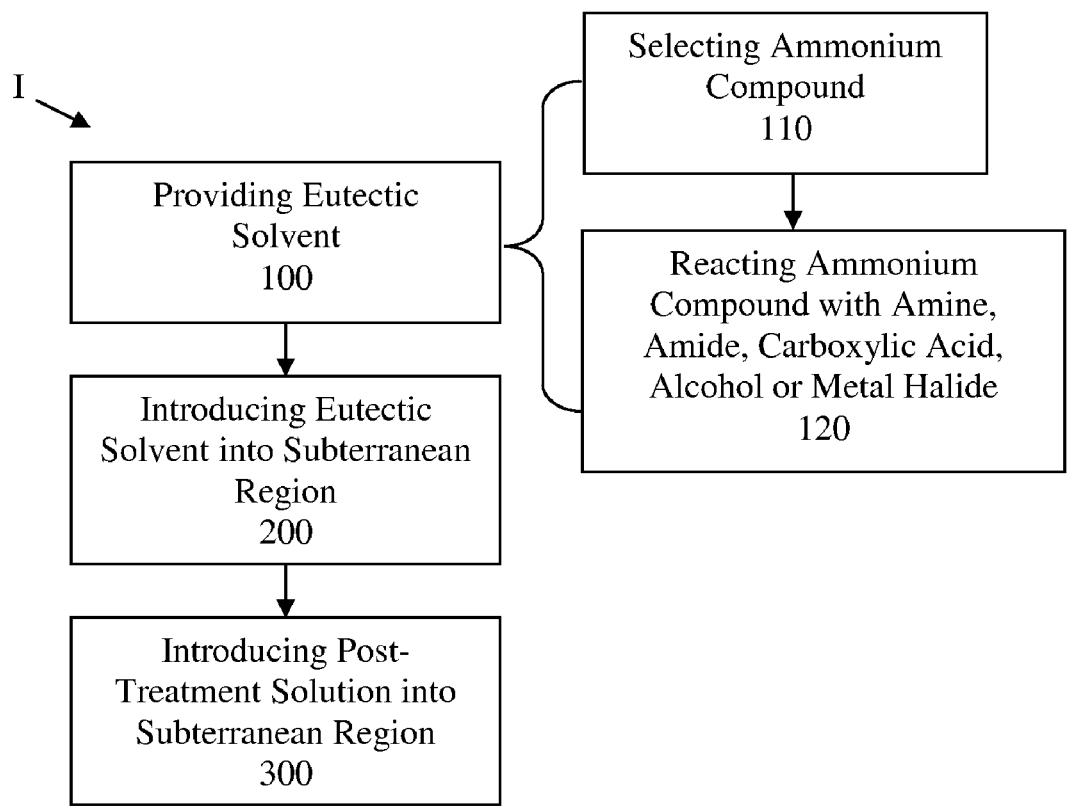
FIG. 1 is a flow diagram of a method of solubilizing cellulose and/or cellulosic materials during drilling and/or fracturing operations according to an embodiment of this disclosure.

As used herein, the terms 'cellulosic' and 'cellulosic material' are used to refer to materials of, relating to, or made from cellulose, including chemically-modified cellulose.

As used herein, the term 'deep eutectic solvent' is used to refer to a type of ionic solvent with special properties, the ionic solvent comprising a mixture which forms a eutectic with a melting point significantly lower than that of its individual components. Such mixtures of proton donors and halide salts are relatively simple to prepare in a pure state. Deep eutectic solvents are non-reactive with water, many are biodegradable, and the toxicological properties of the components are well characterized.

DETAILED DESCRIPTION

I. Overview. This invention relates to the use of deep eutectic solvents (DES) in solubilizing/removing cellulose or chemically-modified cellulosic polymers used in subterranean drilling operations such as fracturing. As discussed below, deep eutectic solvents useful as cellulose solvents include choline chloride or chlorcholine chloride reacted with amides, amines, carboxylic acids, alcohols and/or metal halides. In embodiments of the disclosed method, a DES is pumped downhole after fracturing operations to remove cellulosic material used to thicken fracturing fluids which is left behind in the fractures, on the face of the formation, along the wellbore, etc. The DES can be used alone or in a sequential treatment protocol, for example, DES may be introduced into a subterranean region, followed by introduction thereto of one or more of water, caustic, acid or anhydride as a flush or wash.

Herein disclosed is a method of treating a subterranean region. FIG. 1 is a flow diagram of a method I for treating a subterranean region. Method I is utilized to solubilize cellulose and/or chemically-modified cellulosic polymers used in drilling and fracturing operations. The method may be used to remove cellulose or chemically-modified cellulosic polymers within a subterranean region, to promote removal thereof. Such cellulose may be found in the wellbore as a result of subterranean drilling and fracturing operations. For example, cellulosic materials are typically used as viscosity modifiers in water-based drilling and fracturing fluids. Such cellulosic materials can be selected from the group containing guar, cellulose and chemically-modified celluloses such as carboxy-methylcellulose, hydroxyl-ethylcellulose and the like.

Method I comprises providing a eutectic solvent at 100 and introducing the eutectic solvent into the wellbore at 200, to solubilize and/or remove cellulosic materials therein. The method may further comprise introducing post-treatment solution into the wellbore at 300. As illustrated in FIG. 1, providing a eutectic solvent 100 comprises selecting an ammonium compound at 110 and reacting the ammonium compound to form eutectic solvent at 120.

II. Eutectic Solvent. According to this disclosure, a Deep Eutectic Solvents or solution (DES) is formed by complexing an ammonium compound, for example N-(2-hydroxyethyl) trimethyl-ammonium chloride (choline chloride), with a hydrogen-bond donor (HBD) such as carboxylic acids, amines, amides and alcohols. These liquids have physical and solvent properties that are similar to ionic liquids formed from discrete ions and are easy to produce by simply mixing common commodity chemicals such as choline chloride and carboxylic acids or amides as further discussed hereinbelow.

Deep eutectic solvents can be designed and improved upon using Hole Theory. In Hole Theory, the viscosity of a fluid is related to its free volume and the probability of finding holes of suitable dimension for solvent molecules/ions to enter is related to the surface tension of the fluid. To improve ionic mobility, it is necessary to study the distribution of voids in the liquid. The probability P, of finding a hole of radius r, in a given liquid depends on the following equation:

$$Pdr=(16/15\sqrt{\pi})a^{7/2}r^6e^{-ar^2}dr, \quad (1)$$

wherein $a=4\pi\gamma/kT$, $\gamma$ is the surface tension, k is the Boltzmann constant, and T the absolute temperature (K). Further, the value of $(16/15\sqrt{\pi})$ equals 0.602. Equation (1) indicates that it is possible to increase the average size of the voids in a solvent/solution by decreasing the surface tension. The expected affect would be the higher solubility of cellulose or chemically-modified cellulosic material in the resulting solution.

Ammonium Compound. Method I comprises providing a eutectic solvent 100. Providing a eutectic solvent 100 comprises selecting an ammonium compound 110 and reacting the ammonium compound 120 to produce a eutectic solvent. In applications, the ammonium compound is an ammonium halide. In embodiments, the ammonium compound is an ammonium chloride. In embodiments, the ammonium compound is ammonium chloride. In applications, the ammonium compound is a quaternary ammonium compound. In applications, the quaternary ammonium compound is selected from the group consisting of quaternary ammonium halides. In applications, the quaternary ammonium halide is selected from the group consisting of quaternary ammonium chlorides.

In embodiments, the ammonium compound is selected from the group consisting of the ammonium chlorides having the structure:

$$(R_1R_2R_3)-N^+-R_4-OH\ Cl^- \quad (2)$$

wherein $R_1$, $R_2$, $R_3$, and $R_4$ are each selected from the group consisting of H and $C_xH_y$, wherein $1 \leq x \leq 18$ and $3 \leq y \leq 37$. $R_1$, $R_2$, $R_3$ and $R_4$ can be branched or linear and can be alkyl, aryl or alkylaryl. In embodiments, R1, R2, R3, and R4 are not hydrogen, and the ammonium compound is a quaternized ammonium chloride having the structure as in Eq. (2). In embodiments, $R_1$, $R_2$, $R_3$, $R_4$ or any combination thereof is selected from the group consisting of methyl-, ethyl-, octadecyl-, phenyl, benzyl- and combinations thereof. In applications, $R_1$, $R_2$ and $R_3$ are methyl, and $R_4$ is ethyl. In this embodiment, the ammonium compound is the quaternary ammonium compound N-(2-hydroxyethyl) trimethyl-ammonium chloride $(CH_3)_3-N^+-(CH_2CH_2OH)Cl^-$, also known as choline chloride or vitamin B4.

In embodiments, the ammonium compound is selected from the group consisting of ammonium chlorides having the structure:

$$(R_1R_2R_3)-N^+-R_4Cl \quad (3)$$

wherein $R_1$, $R_2$, $R_3$ and $R_4$ may be the same or different, and can be hydrogen or branched or linear alkyl, alkylaryl, or aryl groups. In applications, $R_1$, $R_2$, $R_3$ and $R_4$ are selected from the group consisting of H and $C_xH_y$, wherein $1 \leq x \leq 18$ and $3 \leq y \leq 37$. In applications, $R_1$, $R_2$ and $R_3$ are selected from the group consisting of methyl-, ethyl-, octadecyl-, phenyl, benzyl-, methoxy-, ethoxy-, and the like. In applications, $R_1$, $R_2$ and $R_3$ are methyl and $R_4$ is ethyl. In such an embodiment, the ammonium chloride may be the quaternary ammonium chloride 2-chloro-N,N,N-trimethylethanaminium. In embodiments, $R_1$, $R_2$, $R_3$, and are hydrogen, and the ammonium compound is ammonium chloride.

In embodiments, the ammonium compound is selected from the group consisting of chloro-substituted ammonium chlorides having the structure:

$$Cl-(R_1R_2R_3)-N^+-R_4Cl \quad (4)$$

wherein $R_1$, $R_2$, $R_3$ and $R_4$ may be the same or different, and can be hydrogen or branched or linear alkyl, alkylaryl, or aryl groups. In applications, $R_1$, $R_2$, $R_3$ and $R_4$ are selected from the group consisting of methyl-, ethyl-, octadecyl-, phenyl, benzyl-, methoxy-, ethoxy-, and the like. In applications, $R_1$, $R_2$ and $R_3$ are methyl groups and $R_4$ is an ethyl group. In this embodiment, the ammonium compound is the quaternary ammonium chloride chlorcholine chloride, [2-chloroethyl-trimethyl-azanium chloride, $Cl^-(CH_3)_3N^+CH_2CH_2Cl$].

In embodiments, the ammonium compound is selected from the group consisting of ammonium chloride, choline chloride [N-(2-Hydroxyethyl) trimethyl ammonium chloride, $(CH_3)_3-N^+-CH_2CH_2OHCl$], chlorcholine chloride, and 2-chloro-N,N,N-trimethylethanaminium. In embodiments, the ammonium compound is a quaternary ammonium compound selected from the group consisting of chlorcholine chloride, choline chloride, 2-chloro-N,N,N-trimethylethanaminium, and combinations thereof.

Second Compound. Reacting the ammonium compound to produce a eutectic solvent at 120 comprises reacting the ammonium compound with a second compound to produce a deep eutectic solvent. The second compound is a hydrogen bond donor (HBD). In applications, the second compound is selected from amines, amides, carboxylic acids, alcohols and metal halides. In applications, the second compound has a chain length ($C_{length}$) in the range of from 1 to 18; from 1 to 10; or from 1 to 8.

In applications, the second compound is an amine. In applications, the second compound is selected from di-functional amines. In applications, the second compound is selected from the group consisting of compounds with the structure:

$$R_1-(CH_2)_x-R_2, \quad (5)$$

wherein $R_1$ and $R_2$ are $-NH_2$, $-NHR_3$, or $-NR_3R_4$ and $2 \leq x \leq 6$. In applications, the di-functional amine compound is ethylene diamine, $H_2N-(CH_2)_2-NH_2$.

In applications, the second compound is an amide. In applications, the second compound is selected from the group consisting of compounds with the structure:

$$R-CO-NH_2, \quad (6)$$

wherein R is H, $NH_2$, $CH_3$, or $CF_3$. In applications, R is $NH_2$, and the compound is urea, $H_2N-CO-NH_2$. In applications, the second compound is selected from 1-methyl urea, $(CH_3NHCONH_2)$, 1,3-dimethylurea $(CH_3NHCONHCH_3)$, thiourea $((NH_2)_2CS)$, and acetamide $(CH_3CONH)$.

In specific embodiments, the deep eutectic solvent (DES) is a solvents/solution of a di-functional amine and N-(2-hydroxyethyl) trimethyl-ammonium chloride, generically choline chloride.

As discussed further in Examples 1 and 2 hereinbelow, reacting the ammonium compound may comprise combining the ammonium compound with an amide (e.g., urea) at a 1:2 mole ratio. The mixture is heated, with stirring, and allowed to react until a clear, viscous, uniform solution is formed. The mixture may be heated to a temperature greater than 80° C., greater than 90° C. or greater than 100° C. If an exotherm is observed, external heating may be discontinued until the exotherm subsides. If the reaction mixture is still not completely clear and uniform, the reaction mixture may be again externally heated to a temperature of greater than 80° C., greater than 90° C. or greater than 100° C. until reaction is complete. The liquid is then allowed to cool to room temperature. Cooling to room temperature may comprise cooling at a rate of less than 1° C./min.

In applications, the second compound is selected from carboxylic acids. In applications, the second compound is selected from mono- and di-functional organic alkyl and aryl acids. In applications, the second compound is a mono-functional carboxylic acid. In embodiments, the ammonium compound is reacted with the mono-carboxylic acid at a 1:2 molar ratio of ammonium compound to mono-functional carboxylic acid to form the eutectic solvent. In applications, the mono-carboxylic acid is selected from phenylpropionic acid ($C_6H_6CH_2CH_2CO_2H$), phenylacetic acid ($C_6H_6CH_2CO_2H$), and combinations thereof.

In applications, the second compound is a di-functional carboxylic acid. As discussed in Example 3 hereinbelow, in such embodiments, the ammonium compound may be reacted with the di-functional carboxylic acid at a 1:1 molar ratio. In applications, the second compound is selected from oxalic acid ($HO_2CCO_2H$), malonic acid ($HO_2CCH_2CO_2H$), succinic acid ($HO_2CCH_2CH_2CO_2H$), and combinations thereof.

In embodiments, the second compound is selected from tris or tri-functional carboxylic acids. In such embodiments, the solvent may be formed at a 30-35 mol % acid. Suitable tri-functional carboxylic acids include citric acid and tricarballylic acid.

In applications, the second compound is a metal halide. The metal halide may be selected from the group consisting of aluminum chloride, zinc chloride, tin chloride, iron chloride, and combinations thereof. The latter three molten product salts have the advantage that they are not water sensitive, although they are found to be, in general, more viscous than the aluminum derivative. The depression of the freezing points may be as much as 190° C.

C. Reacting Ammonium Compound with Second Compound. As discussed further in Examples 1 and 2 hereinbelow, reacting the ammonium compound may comprise combining the ammonium compound (e.g., quaternary ammonium halide) with an amide (e.g., urea) at a 67 mole percent amide; with a mono-functional carboxylic acid at a 67 mole percent mono-functional carboxylic acid; with a di-functional carboxylic acid at 50 mole percent di-functional carboxylic acid; with a tri-carboxylic acid at 30-35 mole percent; or with metal halide at a 30-67 mole percent metal halide, depending upon the charge on the metal halide. For example, $ZnCl_2$ reacts in a different ratio than $FeCl_3$. In the specific case of $ZnCl_2$ the reaction yields $[(CHCl)(ZnCl_2)_2]$ which reflects a reaction ratio of 1:2 or 67 mole percent metal or zinc chloride.

The mixture comprising the ammonium compound and second compound is heated, with stirring, and allowed to react until a clear, viscous, uniform solution is formed. The mixture may be heated to a temperature greater than 80° C., greater than 90° C. or greater than 100° C. If an exotherm is observed, external heating may be discontinued until the exotherm subsides. If the reaction mixture is still not completely clear and uniform, the reaction mixture may be again externally heated to a temperature of greater than 80° C., greater than 90° C. or greater than 100° C. until reaction is complete. The liquid is then allowed to cool to room temperature. Cooling to room temperature may comprise cooling at a rate of less than 1° C./min.

The DES may have a solubility for cellulose of at least 30 weight %, at least 40 weight %, at least 45 weight %, at least 50 weight %, or at least 55 weight %.

III. Introducing the Eutectic Solvent into Subterranean Region. The method further comprises introducing the eutectic solvent into a subterranean region 200. The eutectic solvent may be introduced into a subterranean region such as a wellbore, casing, fracture or face of a formation. The subterranean region may contain therein cellulose or cellulosic material to be solubilized via the eutectic solvent and thus may be removed from the subterranean region. Cellulose or cellulosic materials may be present in the subterranean region as a result of fracturing and/or mud thickening operations, for example, utilized in a drilling operation. The cellulose or chemically-modified cellulose may have been introduced into the subterranean region as a component of a drilling fluid or a fracturing fluid. In specific applications, the DES is introduced into a formation which has been fractured utilizing a fracturing fluid comprising cellulose in order to clean the well bore and the resulting fractures and remove any cellulosic materials that may have deposited during the fracturing operation and now hinder production from the fractures.

In other applications, the DES is introduced into the subterranean region as a component of a drilling fluid (i.e., a fracturing fluid, drilling mud, or other drilling fluid) which further comprises cellulose or cellulosic materials. In this manner, the DES is utilized as an additive to maintain solubility of the cellulose or cellulosic material (e.g., chemically modified cellulose which may, in the absence of the DES, hydrolyze to cellulose, becoming insoluble in the drilling fluid), preventing/minimizing deposition therein.

The DES is introduced into the subterranean region at conditions known to those of skill in the art to be suitable for the introduction of fluids downhole. In applications, the DES is introduced into the subterranean region at a temperature in the range of from about 50° C. to about 150° C. Alternatively, a temperature in the range of from about 65° C. to about 135° C. In applications, the DES is pumped into the subterranean region at a pressure in the range of from about 500 to about 25,000 psig. Alternatively, a pressure in the range of from about 1,000 to about 10,000 psig. Alternatively, a pressure in the range of from about 1,000 to about 5,000 psig.

IV. Introducing Post-Treatment Solution into Subterranean Region. The method I may further comprise introducing post-treatment solution into the subterranean region 300. In instances, the DES is used alone, with no post-treatment. In applications, the Deep Eutectic Solvents (DES) are used and a wash is subsequently introduced into the subterranean region. The wash may be selected from a water wash, a caustic wash, an anhydride wash, an acid wash, or a combination thereof. A caustic wash may be selected from sodium hydroxide and potassium hydroxide. An anhydride wash may comprise acetic anhydride.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

To further illustrate various illustrative embodiments of the present invention, the following examples are provided.

EXAMPLES

Example 1

Synthesis of Choline Chloride/Amide Deep Eutectic Solvent (DES)

Urea which has a melting point of 133° C. (271° F.) is combined with N-(2-hydroxyethyl) trimethyl-ammonium chloride (choline chloride) which has a melting point of 302° C. (575° F.) in a 2:1 molar ratio. One (1) mole (139.6 grams) of choline chloride, [N-(2-hydroxyethyl)trimethylammonium chloride, $(CH_3)_3N^+CH_2CH_2OH]Cl^-$, FW=139.6 g/mol] is employed as a dry powder or flake and is added to 2 moles of urea, an amide, [120 grams [$(NH_2)_2CO$, FW=60 g/mol]. With stirring, the dry mixture is heated to 100° C. (212° F.) until the solids have all been dissolved to affect reaction and remove any latent water in either component. The reaction is continued until a clear, viscous, uniform solution is formed. If an exotherm is observed, external heating is discontinued until the exotherm subsides. If the reaction solution is still not completely clear and uniform, the reaction mixture may again be heated externally to 100° C. (212° F.) until the reaction is complete. The liquid is then allowed to cool to room temperature at a rate no faster than 1° C./min. The yield is quantitative and the product has a melting point of 12° C. (~53.6° F.). The variables for this deep eutectic solvent are: $P=7.63\times10^{-3}$; $\eta_{calc}=11$ cP; $V_m=210.1$ cm$^3$mol$^{-1}$; $V_{free}=9.1\%$; and $E_\eta=58$ kJmol$^{-1}$.

Numerous other choline chloride (ChCl$^-$)/amide compounds can be synthetically prepared employing the method detailed above including but not limited to 1-methyl urea ($CH_3NHCONH_2$, m. p.=29° C.), 1,3-dimethylurea ($CH_3NHCONHCH_3$, m.p.=70° C.), thiourea (($NH_2)_2CS$, m.p.=69° C.), acetamide ($CH_3CONH_2$, m.p.=51° C.) and others.

Example 2

Synthesis of Chlorcholine Chloride/Amide Deep Eutectic Mixtures (DES)

Chlorcholine chloride [Cl$^-$($CH_3)_3N^+CH_2CH_2Cl$), 12.96 g, 0.082 mol) is added to urea (9.78 g., 0.163 mol) and the mixture heated to 80° C. (176° F.) with stirring for approximately 30 minutes. A clear, viscous, uniform solution is formed and allowed to cool to room temperature at a rate of approximately 1° C./min. The liquid can be maintained for at least a month when protected against moisture.

As with choline chloride in Example 1, numerous chlorcholine chloride/amide derivatives can be prepared. The reaction time is reduced due to the higher reactivity coefficient of the chloro-derivative.

Example 3

Synthesis of Choline Chloride/Carboxylic Acid Deep Eutectic Mixtures (DES)

Based on the method presented in Example 1, it becomes apparent that a eutectic is formed at a composition of 67% mol urea. From this data, it can be inferred that to form the eutectic two carboxylic acid molecules are required to complex each chloride ion. Therefore, a mono-functional carboxylic acid molecule reacts with ChCl$^-$ on a 1:2 molar basis as is the case with phenylpropionic acid ($C_6H_6CH_2CH_2CO_2H$) and phenylacetic acid ($C_6H_6CH_2CO_2H$).

Eutectics formed with di-functional carboxylic acids occur at a 50% mol ratio strongly suggesting a 1:1 complex between the acid and the chloride ion or else said acids act as bridging molecules between neighboring chloride ions. Such would be the case when considering oxalic acid ($HO_2CCO_2H$), malonic acid ($HO_2CCH_2CO_2H$) and succinic acid ($HO_2CCH_2CH_2CO_2H$), for example.

The freezing point depression, when compared to an ideal mixture of the two components, for [ChCl$^-$•oxalic acid] is 212° C. as compared to [ChCl$^-$.(urea)$_2$] which was 178° C. but not as large as [ChCl$^-$.(ZnCl$_2$)$_2$] systems 272° C., wherein covalent bonds are formed.

Eutectics formed with tris- or tri-functional carboxylic acids occur at a 30-35% mol acid. Eutectics containing citric and tricarballylic acid exhibit the rheology of gels and are assumed to exhibit extensive bridging between acid groups and their neighboring chloride ions.

The melting point of eutectics formed by the reaction of 1 mol of choline chloride (ChCl$^-$) and 1 mol of oxalic acid is 34° C.; 1 mol of ChCl$^-$ and 1 mol of malonic acid is 10° C.; and 1 mol of ChCl$^-$ and 1 mol of succinic acid is 71° C. The melting point of the choline chloride/citric acid eutectic is 69° C. and the choline chloride/tricarballylic acid eutectic is 90° C.

Example 4

Dissolution of Cellulose with Ionic Liquids (Comparative Example)

In a typical procedure developed by Swatloski, et al. (U.S. Pat. No. 6,824,599), to prepare a 10 wt % solution, 0.5-1.0 grams of fibrous cellulose was placed in a glass vial and [C$_4$mim]Cl ionic liquid (10 grams) was added as a liquid at 70° C. (a temperature above its melting point). The vial was loosely capped, placed in a microwave oven and heated with 3-5 sec. pulses at full power. Between pulses, the vial was removed, shaken or vortexed and replaced in the oven. A clear, colorless, viscous solution was obtained. Although solutions containing 5-10 wt % cellulose are more easily prepared, solutions containing up to 25 wt % cellulose can be formed only as viscous pastes.

[C$_4$mim]Cl ionic liquids are comprised of [C$_4$mim]$^+$ a 1-butyl-3-methylimidazolium cation and Cl$^-$, a chloride ion. In comparing the chemicals employed, the highest cellulose solubility employing an ionic liquid and microwave heating is 25% and the product is a paste.

Example 5

Dissolution of Cellulose with Deep Eutectic Solvents (DES)

The dissolution of various cellulosic polymers including but not limited to xanthan gum, cellulose fibers, modified guar gum, carboxymethyl tamarind and sodium carboxymethyl cellulose were tested employing choline chloride urea eutectics. To a small vial, a 50:50 mixture of the selected polymer and the eutectic solvent of choice was added and the sample placed into a standard convection oven at temperatures between 65-135° C. In all cases, the cellulosic polymers mentioned above were found to be soluble at the lowest temperature tested 65° C. (~150° F.). When allowed to cool to room temperature, a clear, viscous solution or gel was found to have been formed.

Employing a choline chloride/urea deep eutectic solvent, 50 wt % solubility is not at all unreasonable, utilizing reasonable heating techniques. The resulting product at temperature is liquid.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference herein is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A method of treating a subterranean region, the method comprising:
   providing a eutectic solvent; and
   introducing the eutectic solvent into the subterranean region,
   wherein providing a eutectic solvent comprises reacting an ammonium compound with a second compound selected from the group consisting of amines, amides, carboxylic acids, alcohols, metal halides, and combinations thereof, wherein the ammonium compound is a quaternary ammonium compound selected from the group consisting of compounds having the structures: $R_1R_2R_3$—$NR_4Cl$ and $ClR_1R_2R_3$—$NR_4Cl$, and wherein $R_1$, $R_2$, $R_3$, and $R_4$ are each selected from the group consisting of octadecyl-, methoxy-, and ethoxy-groups.

2. The method of claim 1 wherein the second compound has a chain length ($C_{length}$) of $1 \leq C_{length} \leq 18$.

3. The method of claim 1 wherein the second compound is a di-functional amine selected from the group consisting of compounds with the structure:

wherein $2 \leq x \leq 6$, and $R_1$ and $R_2$ are selected from the group consisting of —$NH_2$, —$NHR_3$, and —$NR_3R_4$, where $R_3$ and $R_4$ are selected from alkyl, aryl, and alkylaryl groups.

4. The method of claim 3 wherein the di-functional amine is ethylene diamine, $H_2N$—$(CH_2)_2$—$NH_2$.

5. The method of claim 1 wherein the subterranean region was previously treated with a drilling fluid or a fracturing fluid comprising cellulosic material.

6. The method of claim 1 wherein the eutectic solvent is capable of solubilizing up to 30 wt % cellulosic material.

7. The method of claim 1 wherein the eutectic solvent is introduced into the subterranean region as an additive in a fracturing or other drilling fluid.

8. The method of claim 1 wherein the second compound is selected from the group consisting of amides.

9. The method of claim 8 wherein the second compound is selected from the group consisting of urea, 1-methyl urea, dimethyl urea, thiourea, acetamide, and combinations thereof.

10. The method of claim 9 wherein the second compound is urea, $H_2N$—$CO$—$NH_2$.

11. The method of claim 1 further comprising introducing one or more wash solution into the subterranean following introducing the eutectic solvent into the subterranean region.

12. The method of claim 11 wherein the one or more wash solution is selected from the group consisting of caustic solutions, acid solutions, anhydride solutions, water, and combinations thereof.

13. The method of claim 12 wherein more than one wash solution is introduced into the subterranean region in series.

14. The method of claim 7 wherein the fracturing or other drilling fluid comprises cellulosic material.

15. The method of claim 1 wherein reacting comprises combining the ammonium compound and the second compound to form a mixture, and heating the mixture to a temperature of greater than 70° C.

* * * * *